US007801958B1

(12) United States Patent
Heiska

(10) Patent No.: US 7,801,958 B1
(45) Date of Patent: Sep. 21, 2010

(54) CONTENT CONVERTER PORTAL

(75) Inventor: Jukka Heiska, Helsinki (FI)

(73) Assignee: Nokia Corporation, Espoo (FI)

( * ) Notice: Subject to any disclaimer, the term of this patent is extended or adjusted under 35 U.S.C. 154(b) by 2290 days.

(21) Appl. No.: 09/699,863

(22) Filed: Oct. 30, 2000

(51) Int. Cl.
 *G06F 15/16* (2006.01)
(52) U.S. Cl. ............... 709/206; 709/246; 709/219; 709/217; 709/207; 709/250; 455/450; 345/747
(58) Field of Classification Search ........... 709/246, 709/217, 221, 219, 207, 250; 707/201; 455/450; 345/747
See application file for complete search history.

(56) References Cited

U.S. PATENT DOCUMENTS

| 6,167,441 | A  | * | 12/2000 | Himmel ................... 709/217 |
| 6,336,137 | B1 | * | 1/2002  | Lee et al. ................. 709/219 |
| 6,421,733 | B1 | * | 7/2002  | Tso et al. ................. 709/246 |
| 6,430,624 | B1 | * | 8/2002  | Jamtgaard et al. .......... 709/246 |
| 6,453,361 | B1 | * | 9/2002  | Morris .................... 709/250 |
| 6,501,779 | B1 | * | 12/2002 | McLaughlin et al. ........ 372/52 |
| 6,539,384 | B1 | * | 3/2003  | Zellner et al. ............. 707/10 |
| 6,610,105 | B1 | * | 8/2003  | Martin et al. ............. 715/513 |
| 6,615,131 | B1 | * | 9/2003  | Rennard et al. ........... 701/200 |
| 6,674,453 | B1 | * | 1/2004  | Schilit et al. ............. 715/810 |
| 6,704,798 | B1 | * | 3/2004  | Mogul ..................... 709/246 |
| 6,738,808 | B1 | * | 5/2004  | Zellner et al. ............. 709/223 |
| 6,792,265 | B1 | * | 9/2004  | Chan et al. ............... 455/416 |
| 6,823,373 | B1 | * | 11/2004 | Pancha et al. ............ 709/219 |
| 6,826,592 | B1 | * | 11/2004 | Philyaw et al. ............ 709/202 |
| 6,826,597 | B1 | * | 11/2004 | Lonnroth et al. .......... 709/207 |
| 6,901,437 | B1 | * | 5/2005  | Li ......................... 709/219 |
| 2001/0037404 | A1 | * | 11/2001 | Hafsteinsson et al. ...... 709/246 |
| 2002/0054090 | A1 | * | 5/2002  | Silva et al. ............... 345/747 |
| 2004/0043770 | A1 | * | 3/2004  | Amit et al. ............... 455/450 |

FOREIGN PATENT DOCUMENTS

GB      2 344 197 A   *  5/1999
WO    WO 00/39666       7/2000

OTHER PUBLICATIONS

Van Der Meer S et al: "Flexible control of media gateways for service adaption" Technical University Berlin, XP010511163.
Metter M. et al: "WAP enabling existing HTMP applications" User Interface Conference, 2000. AUIC 2000. First Australasian Canberra, Act, Australia Jan. 31-Feb. 3, 2000, Los Alamitos, CA, USA, IEEE Comput. Soc, US, Jan. 31, 2000, pp. 49-57, XP010371196.

* cited by examiner

*Primary Examiner*—Tammy T Nguyen
(74) *Attorney, Agent, or Firm*—Cohen Pontani Lieberman & Pavane LLP

(57) ABSTRACT

A system including a data network for providing Wireless Application Protocol (WAP) data to wireless terminals from a selection of content servers connected to the data network through a plurality of WAP gateways connected to the data network includes a content converter accessible as a centralized network resource. Characteristics of each wireless terminal and preferences of the user of each wireless terminal are uploaded to the central content converter and stored there. Content provided by a content server is routed through the data network to the central converter for adjustment according to the stored characteristics and preferences, and further routed through the data network to a particular wireless terminal.

16 Claims, 4 Drawing Sheets

CONTENT CONVERTER PORTAL

BACKGROUND OF THE INVENTION

1. Field of the Invention

The present invention relates to wireless devices connected to the Internet, and particularly to conversion of content among a variety of wireless devices connected via the Internet to a wide variety of content providers.

2. Description of the Related Art

As wireless communication devices become more common and become adapted for data communication as well as voice communication, Wireless Application Protocol (WAP) has been specified for data applications by leading telecom and software vendors. A goal of the WAP specification has been to create an open standard that will enable creation of value-added services that can be used with wireless terminals and with server products from various vendors.

The WAP specification defines a set of content formats that are used in creation of the wireless services. In principle, WAP enables content conversion from existing Internet content formats to WAP-defined content formats. Also, since WAP is intended to be an open specification, in principle it ensures that content written according to its specifications will be usable on various terminal types from various manufacturers.

However, it has been found that in practice it is very difficult to ensure usability of services when content is converted among various formats and as various terminals implement browser characteristics in different ways. Thus, difficulties arise from differences among the capabilities of various languages used in content creation, and differences among various types of mobile terminals (e.g., different screen sizes and layouts, input methods, processing capabilities, etc.). Furthermore, a user might prefer individual or idiosyncratic variations in content format.

There is thus a need to adjust conversion of content according to a user's terminal type and according to the user's individual preferences.

SUMMARY OF THE INVENTION

In a system comprising a data network with at least one content server and at least one gateway connected to it and including a mobile telephone network for communicating between mobile terminals and the gateway, the invention provides a content converter accessible to the network and a method of routing data content through the content converter where it is adjusted according to previously uploaded indications of characteristics of a mobile terminal and then forwarded to a gateway for forwarding to the mobile terminal.

In an aspect of the invention, data content is in WAP format.

In another aspect of the invention, the data network is a wide-area network (WAN).

In another aspect of the invention, the data network is the Internet.

In another aspect of the invention, content is further adjusted according to previously uploaded indications of user preferences.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

Figure 1:
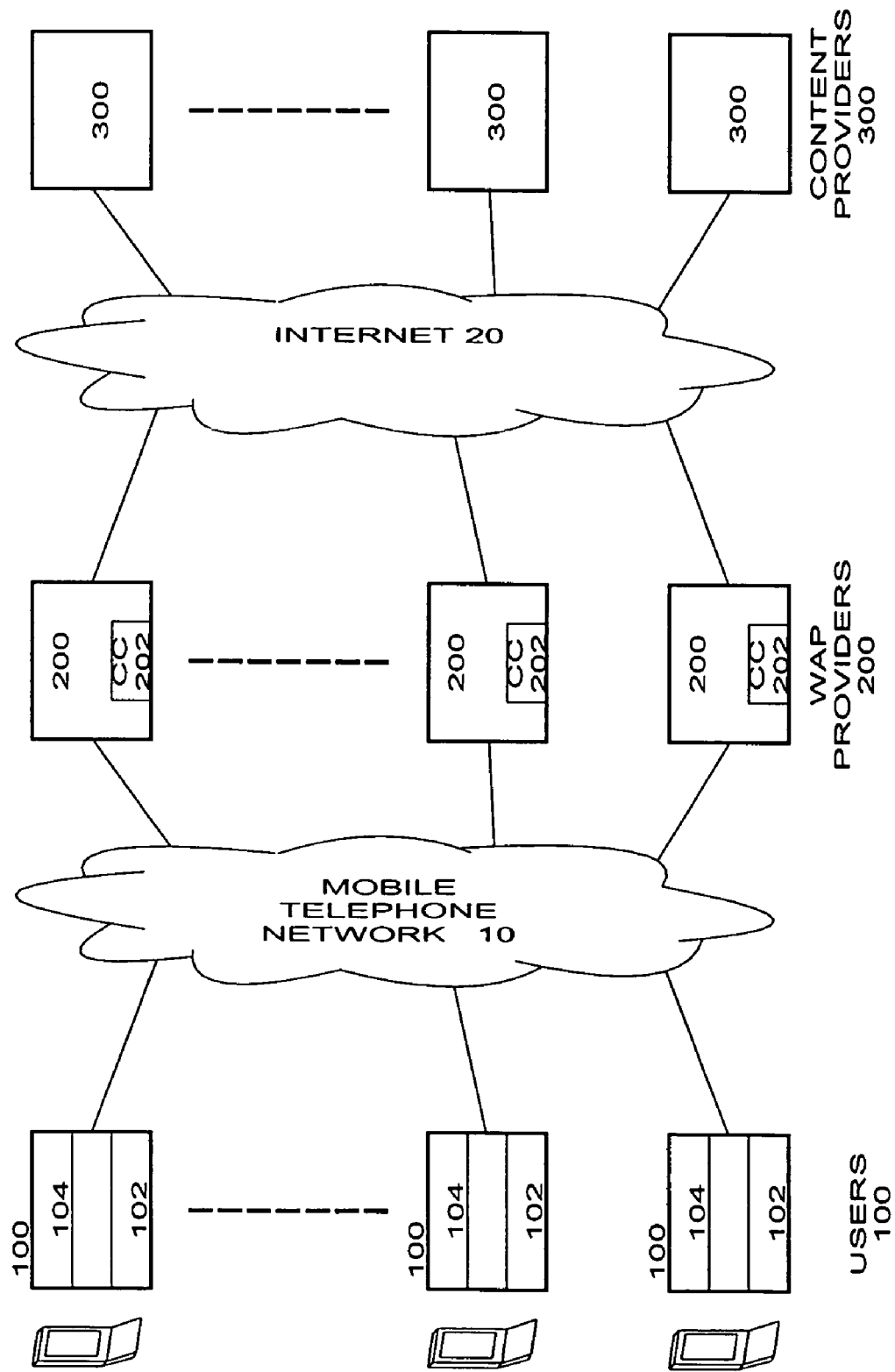
FIG. 1 is a network diagram showing mobile terminals communicating through WAP providers to the Internet in a conventional manner.

FIG. 1 is a network diagram illustrating mobile devices communicating over the Internet to content providers in a conventional manner. A plurality of users are each equipped with mobile terminals 100. Three such terminals are shown, and a dotted line is employed in FIG. 1 to connote that a larger number may actually exist. Associated with each mobile terminal 100 is terminal characteristics 102 and user preferences 104. A mobile terminal 100 may communicate over mobile telephone network 10 to another mobile terminal 100 or to a WAP provider 200. Those in the art appreciate that a WAP provider 200 may be organized either as a proxy or as a gateway. WAP providers 200 communicate via Internet 20 with content providers 300, such as web servers. Content from a content provider 300 is typically returned in wireless markup language (WML) format, perhaps translated to WML at the provider 300 from the hypertext markup language (HTML) typically provided to wired terminals on the Internet 20. Conversion of the content for delivery to mobile devices 100 is accomplished by content converters 202 associated with WAP providers (gateways or proxies) 200. Content converters 202 provide encoding and decoding for efficient data transmission and deliver content via mobile telephone network 10 to mobile terminals 100 in a form that should be intelligible on a broad range of device types; the content, however, may not be entirely appropriate for certain device types, and may not conform with user preferences.

Figure 2:
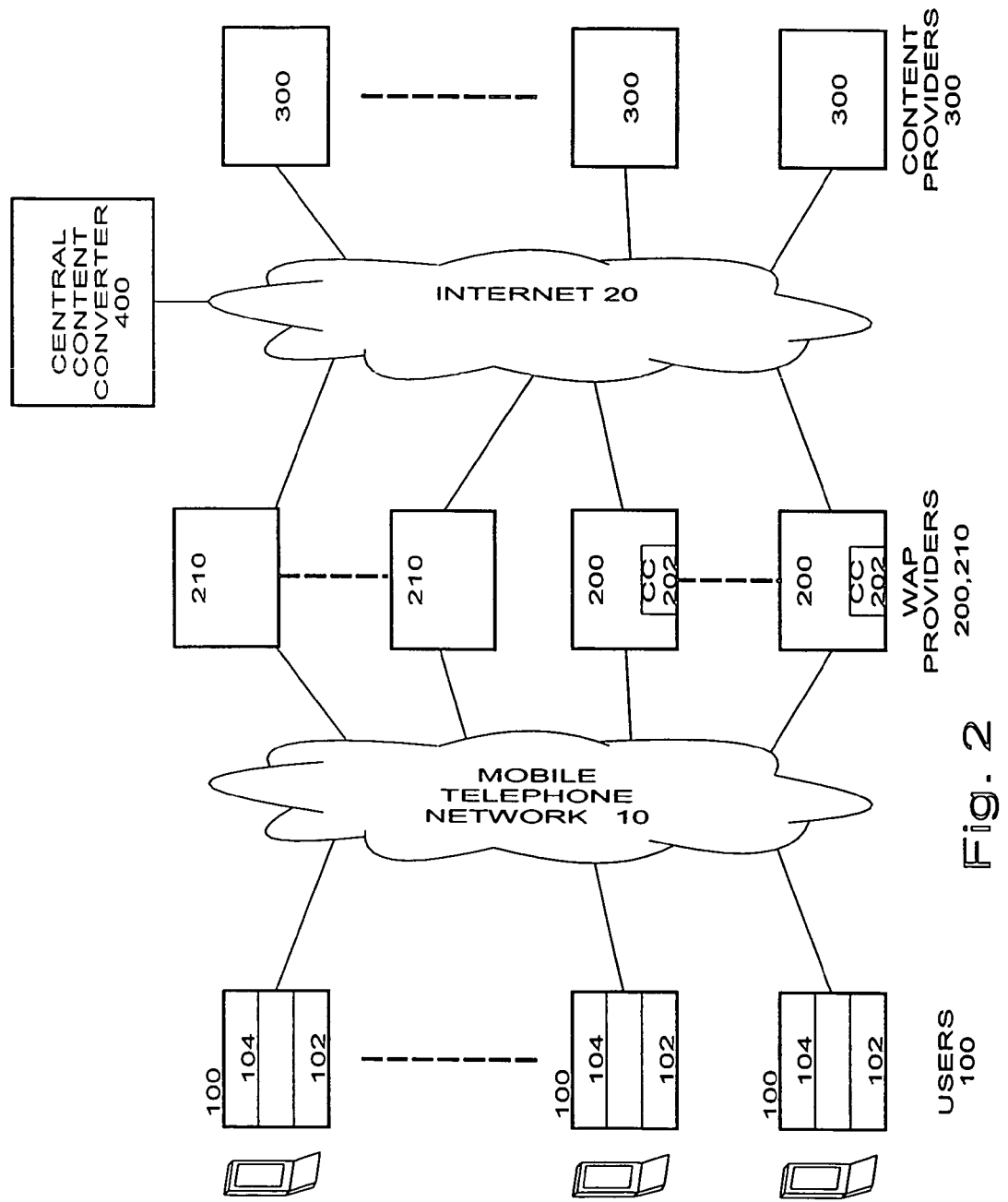
FIG. 2 is a network diagram in which is introduced mobile terminals communicating through WAP providers to the Internet according to the present invention.

FIG. 2 is a network diagram wherein some of the WAP proxies and gateways are provided according to the present invention. A number of prior-art WAP providers 200 may still exist, but FIG. 2 is distinguished by the addition of WAP providers 210 and of central content converter 400. WAP providers 210 do not need to be equipped with content converters 202. Content converter 400 is addressable by a uniform resource locator (URL) and thus is accessible to mobile terminals 100 as a centralized network resource. Mobile terminals 100 upload terminal characteristics and user preferences to central content converter 400. User preferences may be uploaded according to a current usage scenario, or may be preloaded and then selected according to a current scenario.

Figure 3:
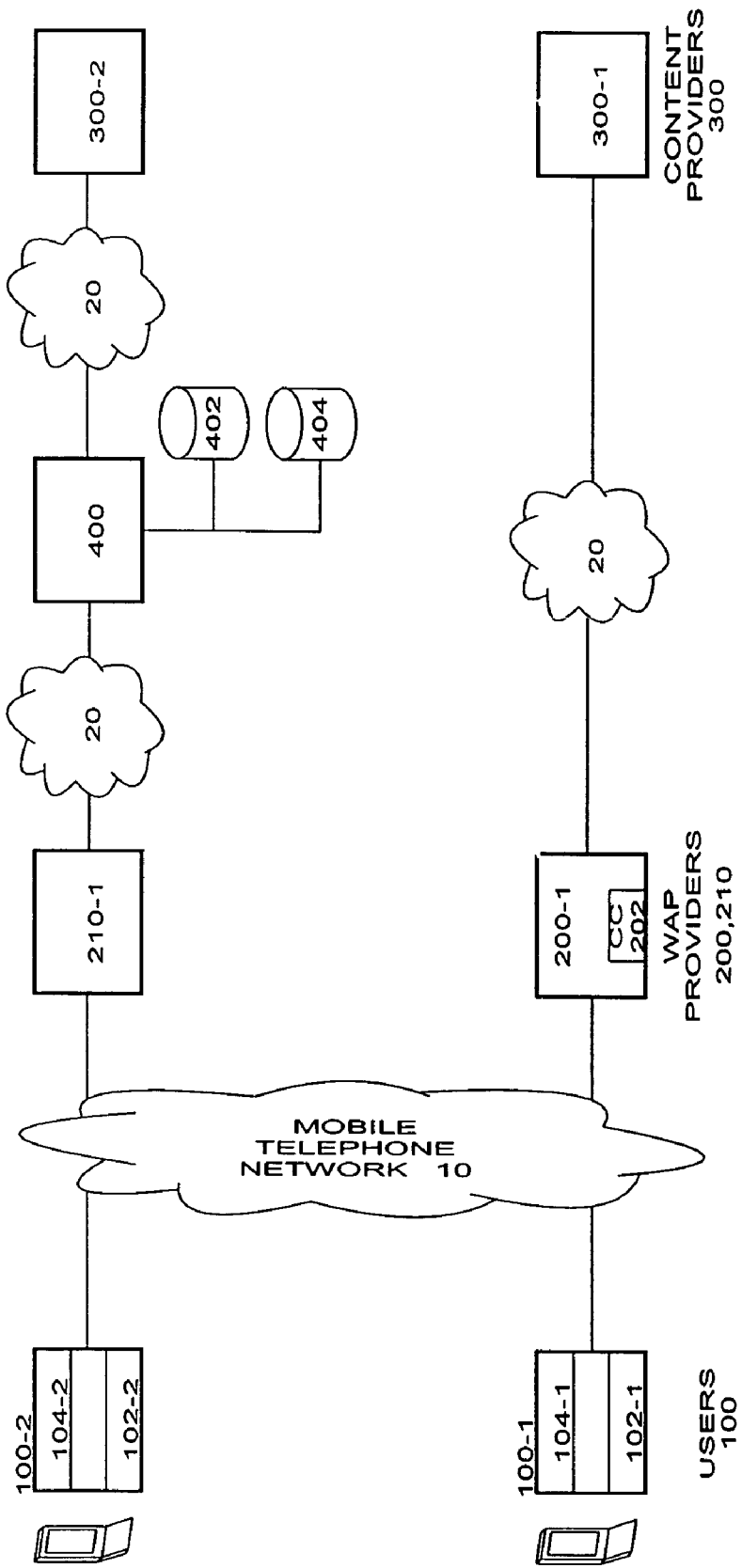
FIG. 3 illustrates data flow through particular ones of the elements depicted in FIG. 2.

FIG. 3 depicts content flow according to the prior art and according to the present invention. A particular one of mobile terminals 100, here designated 100-1, is in communication through mobile network 10 to a particular one of WAP providers 200, designated 200-1, which in turn is in communication through Internet 20 with a particular content provider 300-1. Content requested from 300-1 is sent via Internet 20 to WAP provider 200-1 which employs its internal content converter 202. Content, put in generic WAP format by content converter 202, is passed through mobile phone network 10 to mobile device 100-1.

Figure 4:
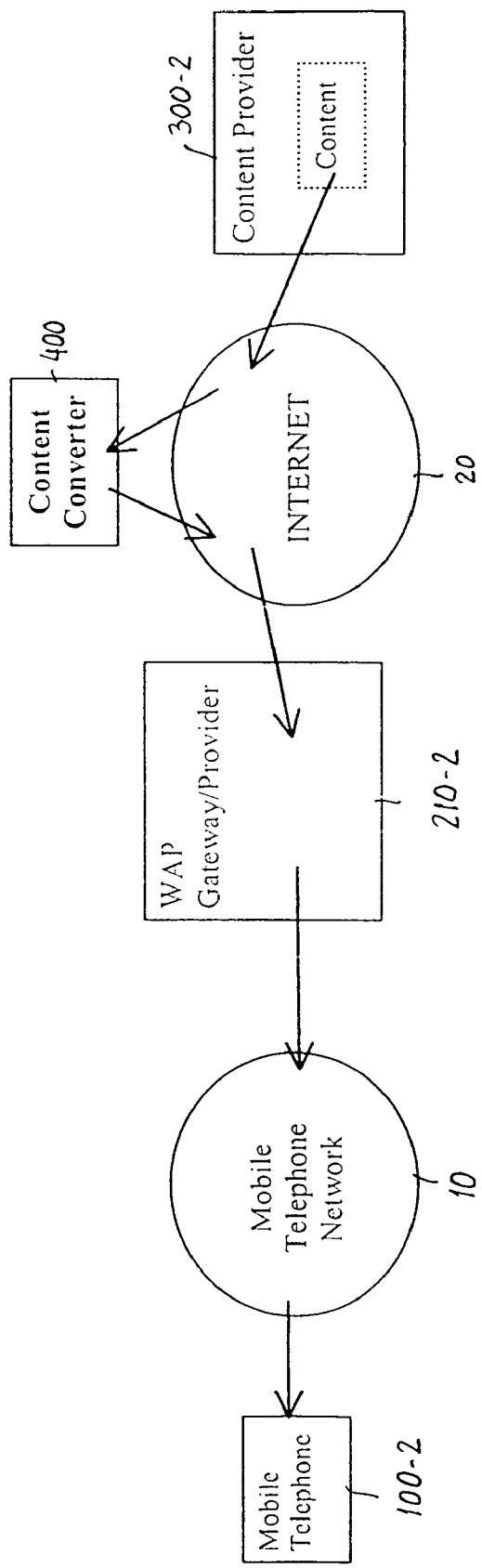
FIG. 4 further illustrates data flow through the elements in FIG. 2 for the present invention.

Another particular mobile terminal 100-2 is making use of the present invention. The content flow according to the present invention is also shown in FIG. 4. The user of terminal 100-2 would previously have uploaded to central content converter 400 a profile of characteristics 102-2 of the particular terminal 100-2 which are stored in database 402, along with characteristics of other terminals 100 that are using the invention. Similarly, the user of terminal 100-2 has previously uploaded to content converter 400 a profile of preferences 104-2, which are stored in database 404 along with preferences of other users of terminals 100 using the invention.

The user of mobile terminal 100-2 requests content from content provider 300-2. The requested content is forwarded from content provider 300-2 via Internet 20 to central content converter 400. The content is nominally in a form which might produce an intelligible display on user terminal 100-2, but as previously noted the particular characteristics of some terminals may not be cooperative. Also, the user may prefer a format other than that preordained in the content. Central content converter 400 adjusts the content according to the profile of terminal characteristics 102-2 stored in database 402, and according to the profile of user preferences 104-2 stored in database 404, and forwards the content through Internet 20 to WAP provider 210-2, which in turn forwards the content through the wireless telephone network 10 to user terminal 100-2.

The present invention permits vendors to introduce new forms of content with no need to distribute appropriate conversion programs to a plurality of WAP servers. The conversion can simply be incorporated into central content converter 400.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Apparatus for providing data services to mobile devices in a system comprising a data network, at least one content server accessible via the data network, at least one gateway for accessing the data network, a mobile telephone network for communicating between the mobile devices and said at least one gateway, and a content converter separate from the at least one gateway, separate from the at least one content server, and connected to the data network, the apparatus comprising:

a data store associated with the content converter for storing indications of the characteristics of each terminal device;

receiving means at the content converter for receiving content for a particular mobile terminal from said at least one content server, said at least one content server being connected to the data network so that said content converter is directly accessible by said at least one content server through the data network bypassing said at least one gateway;

logic for adjusting content for the particular mobile terminal in the content converter according to the stored characteristics of the mobile terminal; and sending means for routing the adjusted content through the data network to said at least one gateway for forwarding to said particular mobile terminal.

2. The apparatus of claim 1, wherein the content is in wireless application protocol (WAP) format.

3. The apparatus of claim 2, wherein the data network is a wide-area network (WAN).

4. The apparatus of claim 3, wherein the WAN is the Internet.

5. The apparatus of claim 1, wherein the data store further stores indications of preferences of the user of each terminal device, and wherein the logic adjusts content in accordance with stored preferences of the user.

6. The apparatus of claim 5, wherein the logic adjusts content in accordance with a preference currently entered by the user and stored.

7. The apparatus of claim 5, wherein the logic adjusts content in accordance with a preference previously stored and currently selected by the user.

8. The apparatus of claim 1, wherein said content converter is accessible directly through the data network as a network resource bypassing the at least one gateway.

9. A system for converting a mark-up language file into a format for presentation on a mobile terminal comprising:

a content server connected to a wide area network (WAN) for transmitting a mark-up language file over said WAN;

a content converter connected to said WAN for receiving the mark-up language file over said WAN from the content server, for converting said mark-up language file into a format appropriate for a mobile terminal, and for transmitting the converted mark-up language file over the WAN; and a gateway between the WAN and a mobile telephone network for receiving the converted mark-up language file from the content converter over the WAN and for transmitting the converted mark-up language file over the mobile telephone network to the mobile terminal;

wherein said content converter is separate and distinct from said content server and from said gateway such that said content converter is directly accessible by said content server through said WAN bypassing said gateway; and wherein said content converter accesses a database storing the characteristics of the mobile terminal in order to convert the mark-up language file into a format appropriate for the mobile terminal.

10. A method for providing data services to mobile devices in a system comprising a data network, at least one content server accessible via the data network, at least one gateway for accessing the data network, a mobile telephone network for communicating between the mobile devices and said at least one gateway, and a content converter separate from the at least one gateway, separate from the at least one content server, and connected to the data network, said method comprising the steps of:

storing, in the content converter, indications of the characteristics of each terminal device;

receiving, at the content converter, content for a particular mobile terminal from said at least one content server directly through the data network, bypassing the at least one gateway;

adjusting, at the content converter, the received content for the particular mobile terminal according to the stored characteristics of the particular mobile terminal; and sending the adjusted content from the content converter to the at least one gateway through the data network for forwarding to the particular mobile terminal.

11. The method of claim 10, wherein said step of storing further comprises storing indications of user preferences for each terminal device and said step of adjusting further comprises adjusting the content in accordance with the stored preferences associated with the user of the particular mobile terminal.

12. The method of claim 11, wherein the user enters the user preferences and the entered user preferences are stored in the content converter.

13. The method of claim 11, further comprising the step of selecting by the user the user preferences to be used for said step of adjusting.

14. The method of claim 10, wherein the content is in wireless application protocol (WAP) format.

15. The method of claim 10, wherein the data network is a wide-area network (WAN).

16. The method of claim 15, wherein the WAN is the Internet.

* * * * *